(12) United States Patent
Schmitt (10) Patent No.: US 10,311,620 B1
(45) Date of Patent: Jun. 4, 2019

(54) SYSTEM AND METHOD FOR CREATING MULTI-SIDED DIGITAL IMAGES

(71) Applicant: Mike Schmitt, Henderson, NV (US)

(72) Inventor: Mike Schmitt, Henderson, NV (US)

( * ) Notice: Subject to any disclaimer, the term of this patent is extended or adjusted under 35 U.S.C. 154(b) by 0 days.

(21) Appl. No.: 15/068,978

(22) Filed: Mar. 14, 2016

Related U.S. Application Data (60) Provisional application No. 62/198,453, filed on Jul. 29, 2015.

(51) Int. Cl.
*G06T 13/20* (2011.01)
*G06Q 30/02* (2012.01)
*G06T 11/60* (2006.01)
*G06F 3/0484* (2013.01)

(52) U.S. Cl.
CPC .......... *G06T 13/20* (2013.01); *G06F 3/04842* (2013.01); *G06F 3/04845* (2013.01); *G06Q 30/0257* (2013.01); *G06Q 30/0261* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 7,865,623 B2* | 1/2011 | Mayle | .................. | G06Q 10/107 709/206 |
| 2003/0115286 A1* | 6/2003 | Mayle | .................. | G06Q 10/107 709/217 |
| 2004/0254859 A1* | 12/2004 | Aslanian, Jr. | ........ | G06Q 10/107 705/14.73 |
| 2007/0038727 A1* | 2/2007 | Bailey | .................... | G06Q 10/02 709/219 |
| 2012/0276880 A1* | 11/2012 | Angorn | .................... | H04W 4/12 455/414.1 |
| 2013/0218968 A1* | 8/2013 | McEvilly | ........... | G06Q 30/0261 709/204 |
| 2014/0104312 A1* | 4/2014 | Zaltzman | ................ | G06T 11/60 345/632 |
| 2014/0282263 A1* | 9/2014 | Pennington | ........... | G06F 1/1616 715/838 |
| 2015/0039709 A1* | 2/2015 | Jacobs | .................... | H04L 51/10 709/206 |
| 2016/0227184 A1* | 8/2016 | Nims | .................. | H04N 13/0409 |

* cited by examiner

*Primary Examiner* — Ryan McCulley
(74) *Attorney, Agent, or Firm* — FisherBroyles, LLP; Rob L. Phillips (57) ABSTRACT

A system and method for creating multi-sided digital images involving at least one processor configured to run an image forming application, wherein the processor running said image forming application is configured to: (i) receive a digital sponsor image and a digital personal photo image from a user; (ii) generate an animated or video-based multi-sided digital image with at least one side depicting said digital sponsor image and at least another side depicting said personal photo, said animated or video-based multi-sided digital image configured to rotate and/or flip on a display of said one or more computer devices to show said digital sponsor image and said digital personal image; and (iii) transmit said animated or video-based multi-sided digital image to a user's computer device.

14 Claims, 8 Drawing Sheets

SYSTEM AND METHOD FOR CREATING MULTI-SIDED DIGITAL IMAGES

CROSS-REFERENCE

This application claims priority to U.S. Patent Application No. 62/198,453 filed Jul. 29, 2015 which is incorporated herein for any and all purposes.

FIELD OF THE INVENTION

The embodiments of the present invention relate to a system and method for creating multi-sided digital images via an electronic medium.

BACKGROUND

Branding is an important aspect to the any business, event, product and/or service. Much of this branding now occurs online via social networking websites like Facebook®, Twitter®, etc. Linking live photos and video of events with promotional or sponsorship images is one way to brand a business, event, product and/or service.

It would be advantageous to develop an easy-to-use system and method for linking photographs with promotional and sponsorship images in the form of a multi-sided digital image capable of being flipped and/or rotated and easily circulated via global computer networks. It would be advantageous if said multi-sided digital image supported audio tracks or voice tags as well.

SUMMARY

The embodiments of the present invention are directed to a system and method for creating multi-sided digital images comprising a web server configured to store data in the form of sponsor and/or promotional images, audio tracks and/or user accounts; and an application configured to run on the web server, said application configured to: (i) receive sponsor and/or promotional images for upload to said web server; (ii) accept requests from a user to select sponsor and/or promotional images from said web server; (iii) receive a personal photo for upload and (iv) create a multi-sided digital image having at least one side in the form of said user-selected personal photograph and at least a second side in the form of sponsor and/or promotional image, said multi-sided digital image created such that said multi-sided digital image may be flipped and/or rotated from side-to-side on a display to show at least said personal photograph or said sponsor and/or promotional image as desired by a viewer thereof.

In another embodiment, at least one processor configured to run an image forming application, said processor in communication with one or more computer devices, each of said one or more computer devices including a display, user interface, and memory in communication with said at least one processor; and wherein said processor running said image forming application is configured to: (i) receive a digital sponsor image and a digital personal photo image from a user; (ii) generate an animated or video-based multi-sided digital image with at least one side depicting said digital sponsor image and at least another side depicting said personal photo, said animated or video-based multi-sided digital image configured to rotate and/or flip on a display of said one or more computer devices to show said digital sponsor image and said digital personal image; and (iii) transmit said animated or video-based multi-sided digital image to a user's computer device A method of the present invention comprises: utilizing a processor running an image forming application for: (i) receiving a digital sponsor image; (ii) receiving a digital personal photo from a user; (iii) generating an animated or video-based multi-sided digital image with at least one side depicting said digital sponsor image and at least another side depicting personal photo, said animated or video-based multi-sided digital image configured to rotate and/or flip on a display to show said digital sponsor image and said digital personal image; and (iv) transmitting said animated or video-based multi-sided digital image to a user's computer device.

Another embodiment is directed to a system and method for creating multi-sided digital images comprising a server configured to manage user accounts, login information and/or sponsorship information, including promotional images and/or audio tracks; and an application configured to run on a user's computer device, said application configured to: (i) receive sponsor and/or promotional images from said server; (ii) accept requests from a user to select sponsor and/or promotional images from said server; (iii) receive a stored or newly taken personal photo for upload and (iv) create a multi-sided digital image having at least one side in the form of said user-selected personal photograph and at least a second side in the form of sponsor and/or promotional image, said multi-sided digital image created such that said multi-sided digital image may be flipped and/or rotated from side to side to display at least said personal photograph or said sponsor and/or promotional image as desired by a viewer thereof In another embodiment, the system and method utilize share requests to permit a user to automatically transmit the multi-sided digital image to social media websites.

In one embodiment, the system and method described herein present a novel mechanism for branding an event (e.g., movie release) with photographs from the actual event. In such an embodiment, one side of a two-sided digital image is a digital photograph (or image) of the event and the other side is a logo, image, coupon and/or information related to an event sponsor, promoter or the like. Any event may benefit from the embodiments of the present invention.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a computer should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

As used herein, photo, photograph and image may be any type of digital image (e.g., Jpeg, PDF, etc.) which may be displayed by a computer device.

Figure 1:
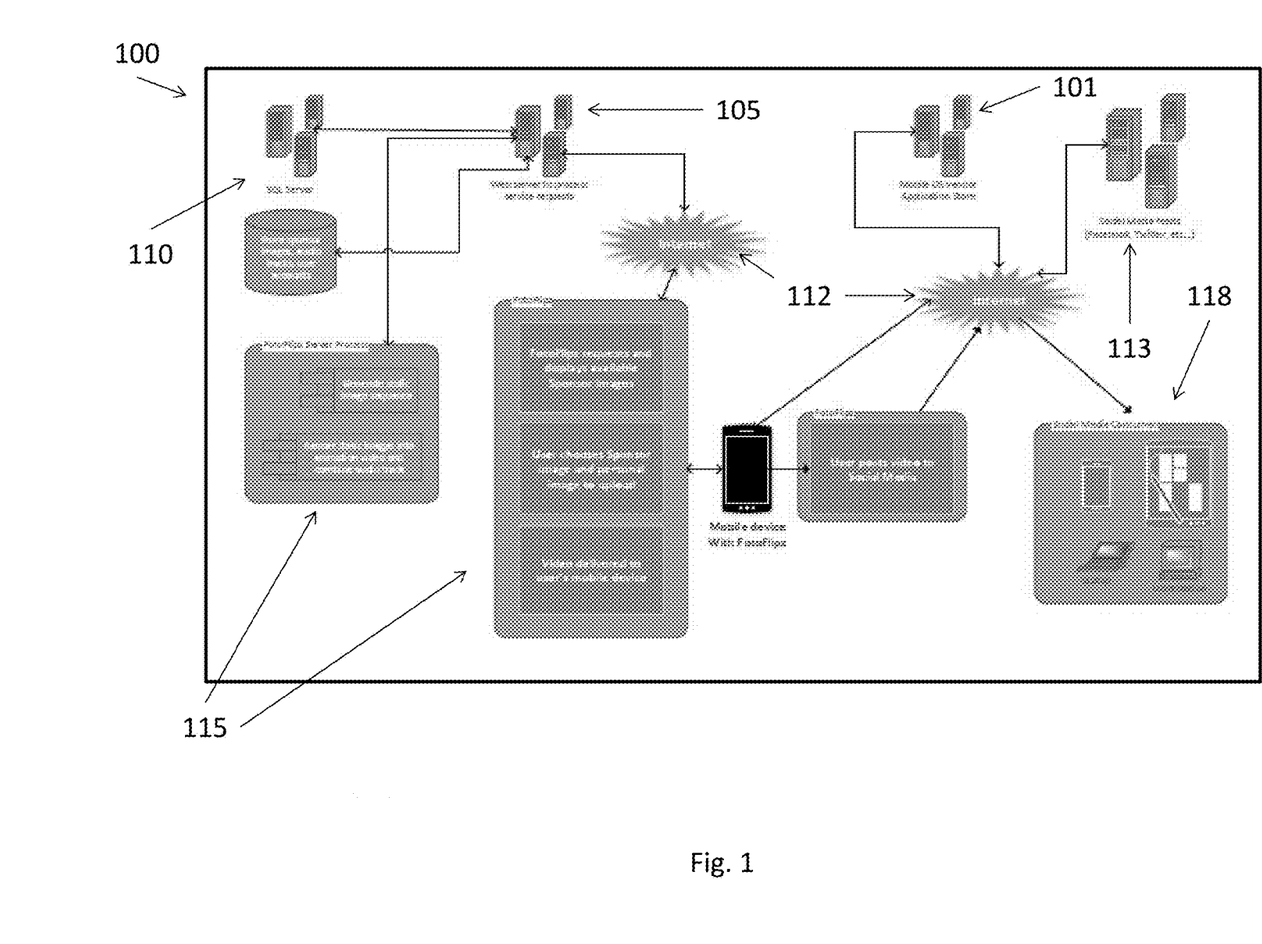
FIG. 1 illustrates a block diagram of system according to the embodiments of the present invention.

FIG. 1 shows a block diagram of a system 100 according to the embodiments of the present invention. In broad terms, the system 100 comprises a web server 105, database server 110 (e.g., SQL server) and software-based application ("App") 115 running on one or more computer devices. In one embodiment, the web server 105 stores sponsor images, audio tracks, user accounts, etc., and is configured (e.g., a processor running executable instructions) to generate static image sequences and render static images into animation video and combine with audio tracks as detailed below. The web server 105 may be accessed via a dedicated website via an Internet connection 112. The App 115 includes an animation or video rendering tool 120 which creates the flipping and/or rotating two-sided digital image. In one embodiment, such flipping and/or rotation may be simulated slowly on a display to highlight the three-dimensional perception of such flipping and rotation. While a two-sided digital image is detailed herein for the sake of brevity, the embodiments of the present invention are not so limited and may be used to create digital images with more than two sides (e.g., a six-side digital image in form of a cube, etc.).

The software-based application 115 permits users to view and select images from the stored sponsor images. In one embodiment, the available digital sponsor images are geo-tagged such that users are aware of their origin. In another embodiment, access to the two-sided digital images may also be restricted to users in certain geographic areas to correspond to sponsor's needs. User location may be determined using GPS, WiFi or other location means. For example, the two-sided digital images may be accessed only by those geographically located near a subject event. For example, if a user is at an event in Los Angeles, Calif., specifically Staples Center, digital sponsor images associated with the Staples Center event may be accessed and used by those located at the event. The sponsors may also associate audio tracks and/or voice tags with stored digital images. The audio tracks and/or voice tags then move with the digital sponsor image selected by the user. Along with the digital sponsor image (and optionally audio track and/or voice tag), the user selects a digital personal photo. The digital personal photo may be taken by, and stored on, a mobile device used to access the App 115 or the web server 105 or database server 110. Alternatively, the digital personal photo may be accessed from other locations accessible from the user's computer device, including a mobile device. The photos and images may be accessed from databases, memory and similar storage devices.

Upon selection of the digital sponsor image and digital personal photo, the App 115, via the animation or video rendering tool 120, creates an animation or video rendering of a two-sided digital image comprising the digital sponsor image on a first side and the digital personal photo on a second side. In other embodiments, the two-sided digital image may have more than two sides (e.g., a cube with six sides). With a cube, for example, the cube maybe flipped or rotated from side-to-side such that all six sides, having a mix of digital personal photos and digital sponsor images may be viewed. Once created, the App 115 causes the animated two-sided digital image to be transmitted to the user's mobile device. In another embodiment, the two-sided digital image is created on the user's computer device. In such an embodiment, the software application runs on the user's computer device rather than the server which is then used for administrative tasks and sponsorship needs only. On the display of the mobile device, the two-sided digital image may rotate automatically or via manual techniques facilitating the perception of a three-dimensional, two-sided digital image. By utilizing particular dimensions, the two-sided digital image takes on the appearance of a three-dimensional, business card, credit card and/or similarly-sized physical object.

The animation tool or video rendering tool 120 forms the two-sided digital image with the digital sponsor image and digital personal photo by dimensioning the images and formatting them into a flippable and/or rotatable two-sided digital image. The two sided digital image is created by (i) generating individual animation frames; (ii) combining them into a video or animation sequence; and (iii) employing zooms and fades giving the impression of a three-dimensional physical object (e.g., card rotating or being flipped). This processing can be accomplished on the remote server or on the user's computer device (e.g., smart phone).

Figure 3A:
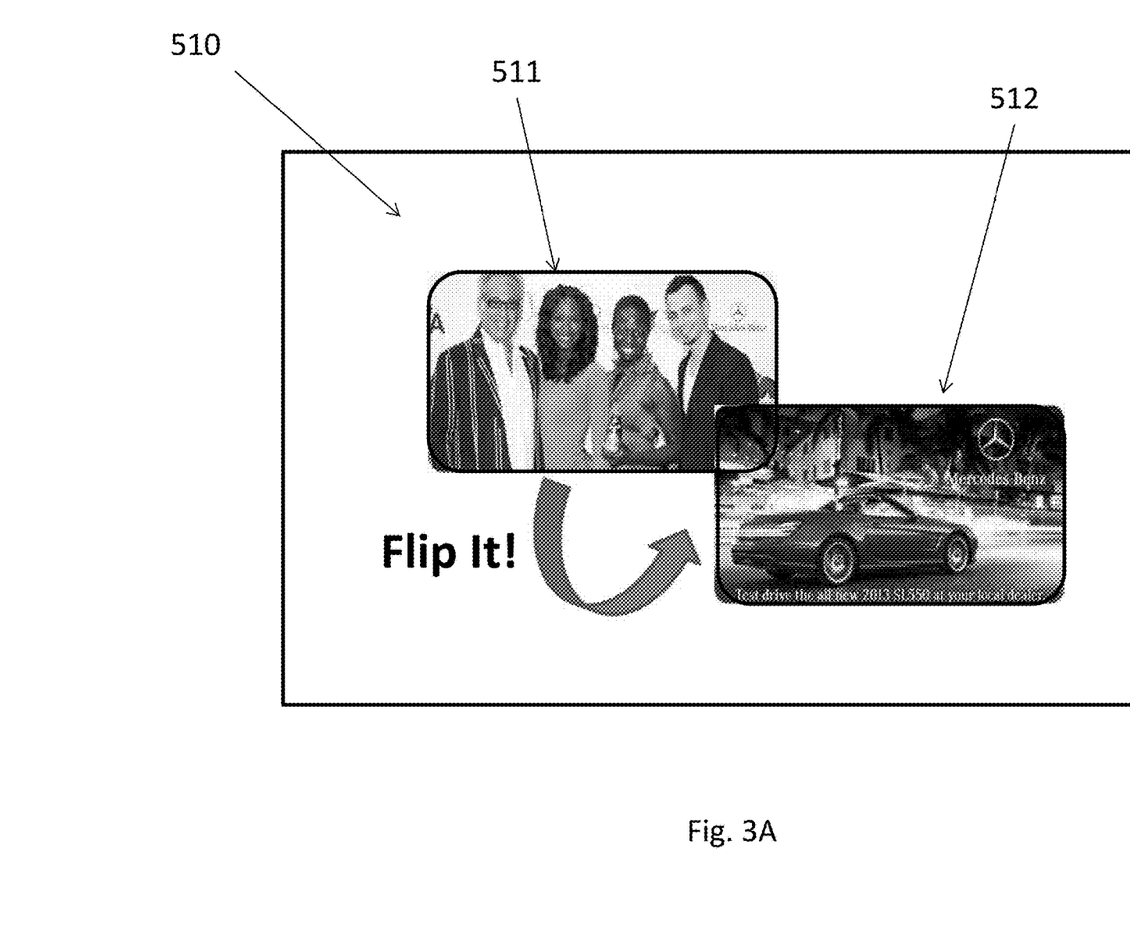
FIGS. 3A-3C illustrate exemplary two-sided digital images created according to the embodiments of the present invention.
Figure 3B:
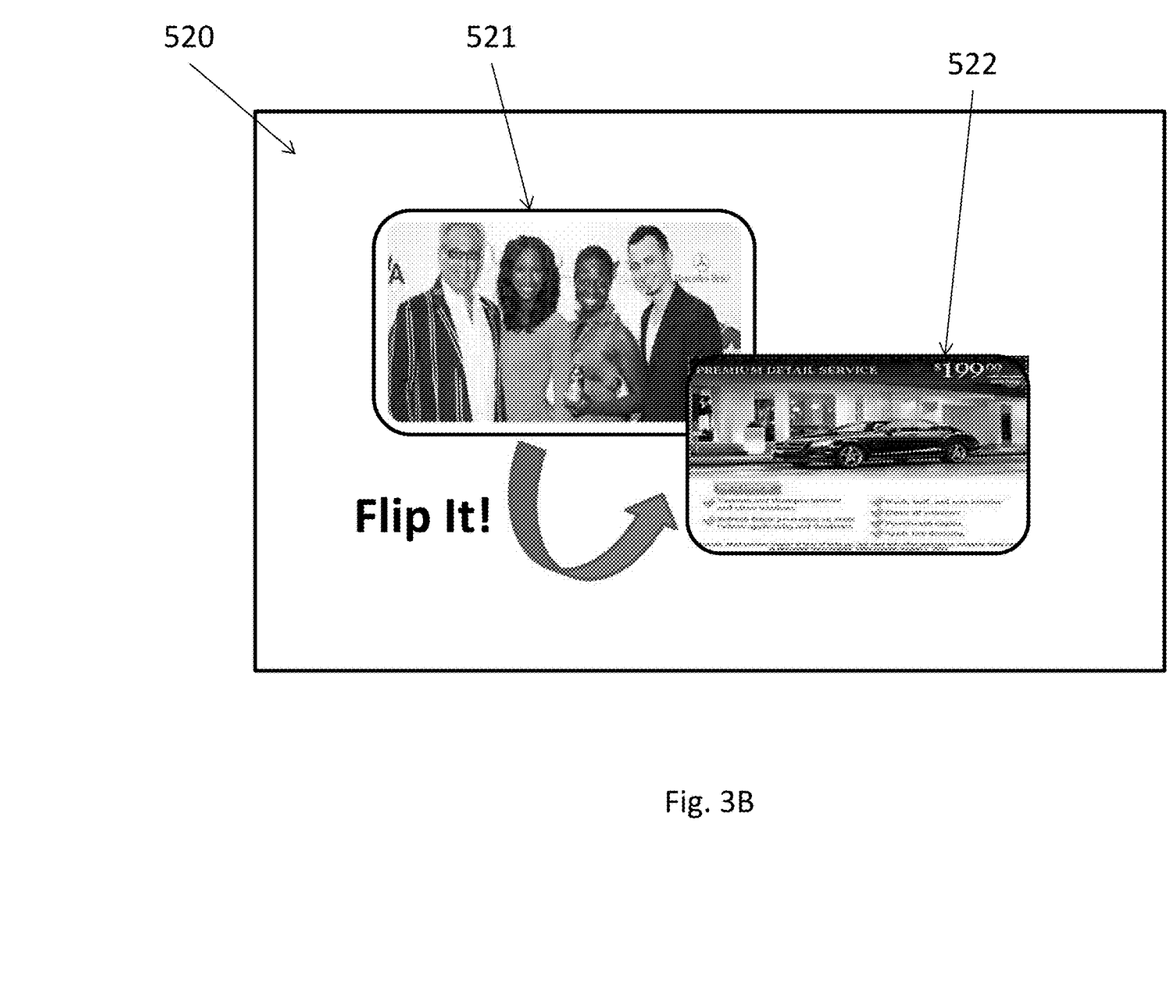
Figure 3C:
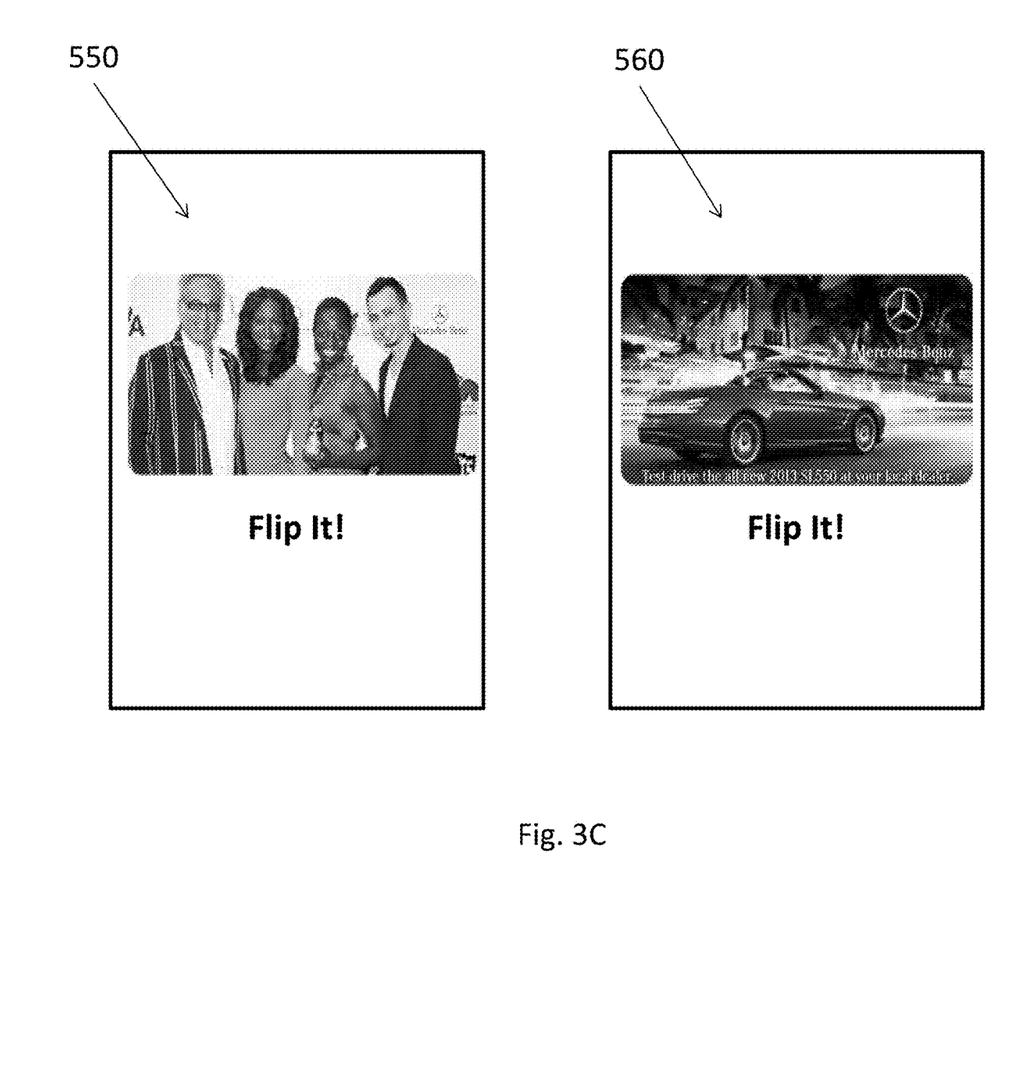
Figure 4:
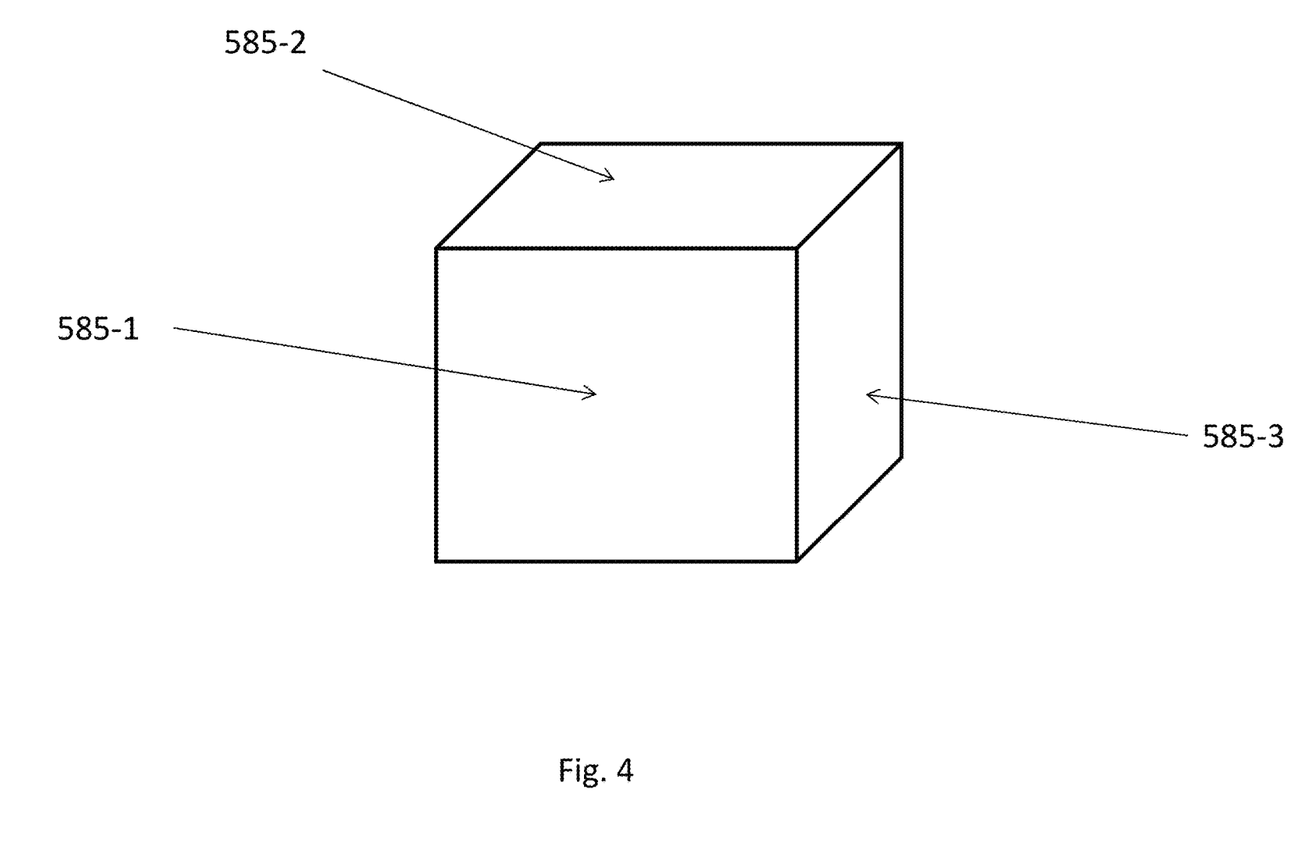
FIG. 4 illustrates a six-sided digital image created according to the embodiments of the present invention.

FIGS. 3A and 3B show exemplary two-sided digital images created according to the embodiments of the present invention. The two-sided digital image 510 of FIG. 3A is a first image 511 comprising a digital personal photo and a digital second image 512 comprising a digital sponsor image configured in the form of a three-dimensional card which may be flipped automatically or manually when desired by the observer. The two-sided digital image 520 of FIG. 3B is a first image 521 comprising a digital personal photo and a digital second image 522 comprising a sponsor coupon configured in the form of a three-dimensional card which may be flipped automatically or manually when desired by the observer. In practice, as shown in FIG. 3C, the observer views one image at a time and has the option to flip the two-sided digital image via the computer device interface (e.g., touch screen) (FIGS. 3A and 3B are for purposes of illustration such that in practice both sides of the two-sided digital image are normally not viewable simultaneously). In FIG. 3C, digital personal photo 550 is the first side image and flippable and/or rotatable to display the second side digital image comprising the digital sponsor image 560 and vice versa. FIG. 4 shows a cube 580 which can support six digital images (three of the six sides 585-1 through 585-3 are visible in FIG. 4).

Figure 2A:
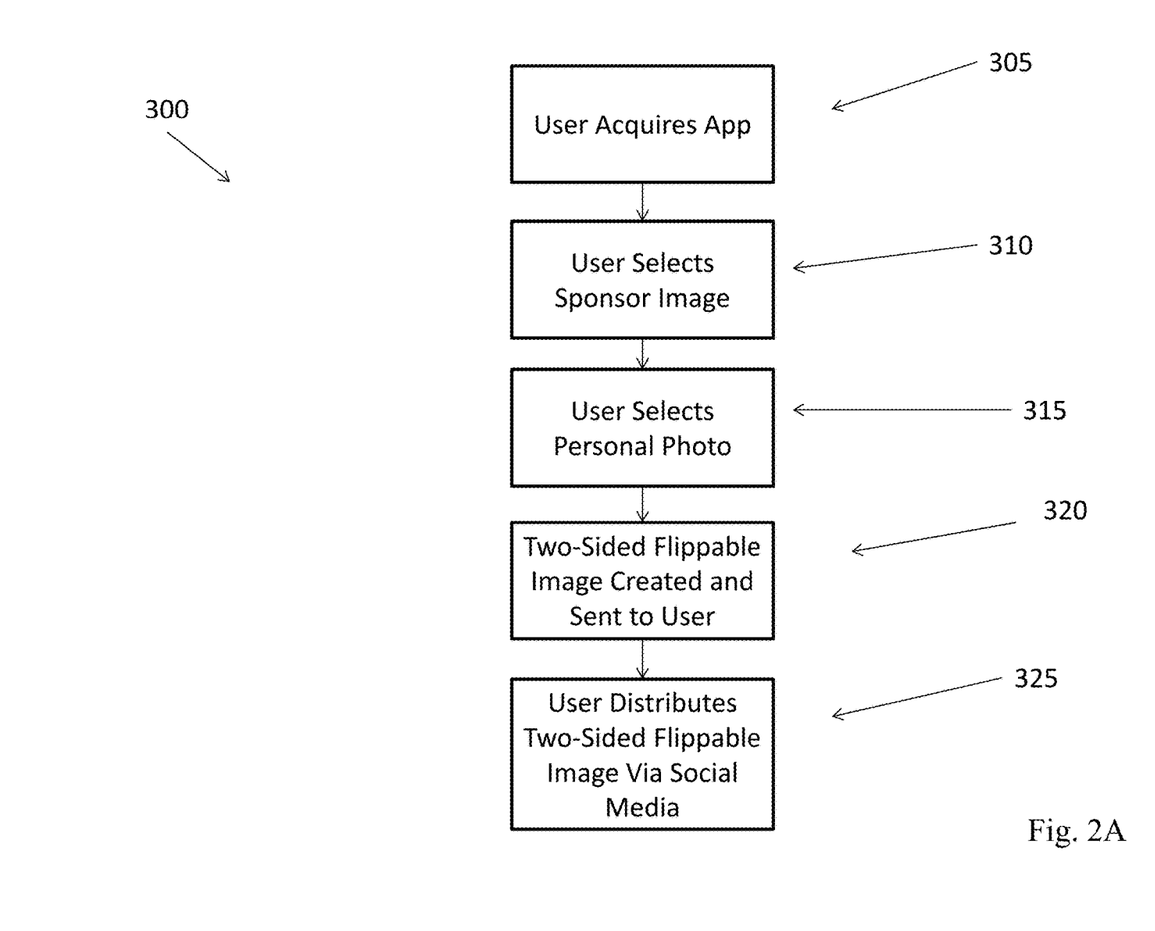
FIG. 2A illustrates a flow chart detailing one methodology for developing and distributing a two-sided digital image according to the embodiments of the present invention.

FIG. 2A illustrates a flow chart 300 detailing one methodology for developing and distributing a two-sided digital image according to the embodiments of the present invention. At 305, a user acquires the App 115 via a retail outlet (e.g., iTunes®). At 310, the user selects a sponsor image via the App 115. The sponsor images are stored in the web server 105 which may be accessed via the App 115 and/or dedicated website via an Internet connection. Sponsor images are created by sponsors and/or commissioned to third parties to create. In one embodiment, the sponsor images are related to specific events and used to promote such events short term and the sponsor long term. The sponsor images may include virtual coupons, discounts, special offers, promotions, etc. Such items may be barcoded for ease of use by downstream customers. The sponsors may associate audio tracks and/or voice tags with the sponsor images. The audio tracks and/or voice tags are then playable when the sponsor images are viewed by the end user or targeted audience.

In one embodiment, access to sponsor images is restricted to users located proximate to an event being promoted by said sponsor images. In this manner, users near or at the event are those promoting the event. Mobile device GPS, WiFi or similar tracking systems may be used to support this embodiment. Certain sponsor images may only be accessible and selectable by those in pre-established locations. In one embodiment, the geo-location feature is used to identify the location of the user in order to display restricted and/or specific content, such as may be desirable to a sponsor (whose information is on one side of the image) for a certain event and to display system categories in the most relevant order as determined by the users current location.

At 315, the user selects a personal photo stored on the user's mobile device or elsewhere. At 320, via the App 115 running on the web server 105 and/or mobile device, the sponsor image and personal photo are used to create an animated or video-based two-sided digital image (with audio tracks and/or voice tags) and transmitted to the user's mobile device (or other computer device). At 325, from the user's mobile device, the user may distribute the animated or video-based two-sided digital images (with or without audio tracks and/or voice tags) to social media websites 114 via the Internet connection 112. From the social media websites 114, consumers, friends or others 118 having access to the user's social media outlets via the Internet 112 are able to access the two-sided digital images. In this manner, the sponsor's brand is disseminated throughout the social media world and may "go viral."

Figure 2B:
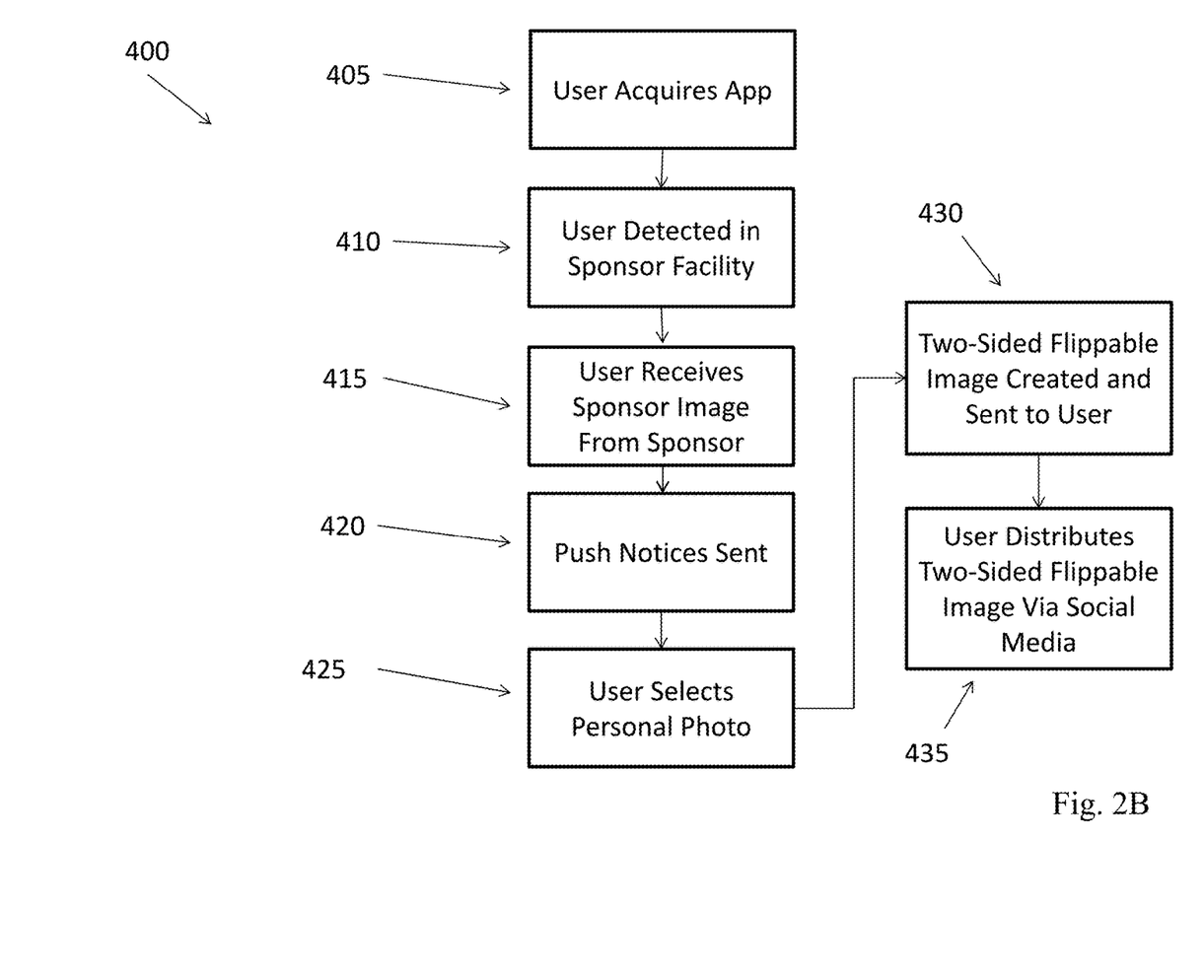
FIG. 2B illustrates a flow chart detailing another methodology for developing and distributing a two-sided digital image according to the embodiments of the present invention.

FIG. 2B illustrates a flow chart 400 detailing one methodology for developing and distributing a two-sided digital image according to the embodiments of the present invention. In this embodiment, sponsors send images to smart devices of users having the App 115 downloaded in an effort to encourage users to disseminate the two-sided flappable digital images. At 405, a user acquires the App 115 via a retail outlet (e.g., iTunes®). At 410, a user is detected in a sponsor facility. The detection may be accomplished via GPS location features associated with a mobile device or via the businesses WiFi network or any other location service. At 415, a user receives a sponsor image via the App 115 or directly to the user's mobile smart device. In this embodiment, the sponsor transmits the sponsor image or images to the user. For example, a user visiting a Starbucks® location may receive a digital Starbucks® image (with or without audio and/or voice tracks) prepared by Starbucks® in the hope that the user utilizes the App 115 to create and disseminate a two-sided flappable digital image with the Starbucks® image and related information. Along with the digital sponsor image, the sponsor may also transmit a coupon or other reward redeemable upon the user disseminating a two-sided flippable digital image using, for example, the digital Starbucks® image. In one embodiment, at 420, a push-notice, SMS or similar communication tool requests feedback regarding (i) whether or not said user's mobile smart device stores an application for generating said animated or video-based multi-sided digital image; (ii) whether or not the user desires to download an application on said user's mobile smart device for generating said animated or video-based multi-sided digital image and/or (iii) permission to transmit said sponsor image to said user's mobile smart device once, or if, the user has downloaded the application on said user's mobile smart device for generating said animated or video-based multi-sided digital image At 425, the user selects a digital personal photo stored on the user's mobile smart device or elsewhere. At 430, via the App 115 running on the web server 105 and/or mobile smart device, the digital sponsor image and digital personal photo are used to create an animated or video-based two-sided digital image (with or without audio tracks and/or voice tags) and transmitted to the user's mobile smart device (or other computer device). At 435, from the user's mobile smart device, the user may distribute the animated or video-based two-sided digital images (with or without audio tracks and/or voice tags) to social media websites 114 via the Internet connection 112. From the social media websites 114, consumers, friends and the like 118 having access to the user's social media outlets via the Internet 112 are able to access the two-sided digital images thereby building the sponsor's brand.

Figure 5:
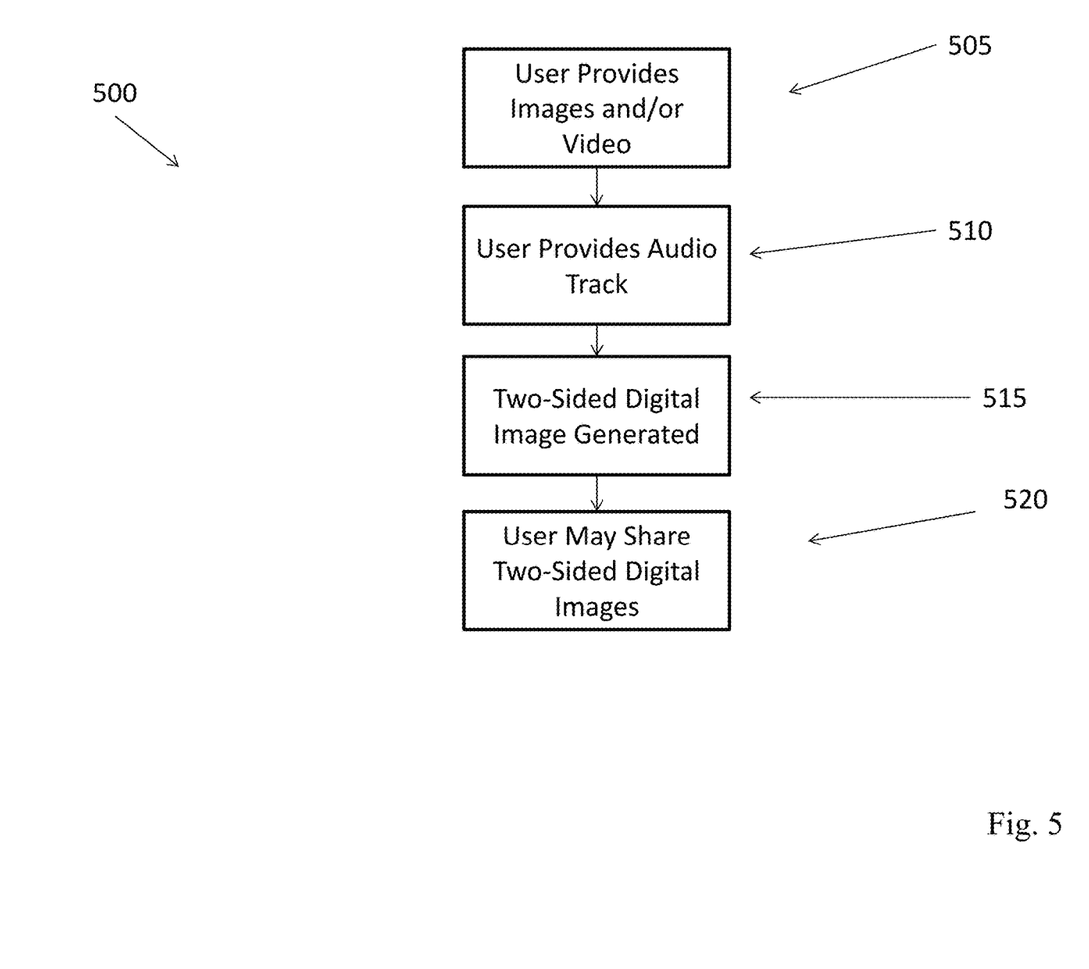
FIG. 5 illustrates a flow chart detailing one embodiment for generating a multi-sided digital image according to the embodiments of the present invention.

FIG. 5 shows a flow chart 500 detailing one embodiment for generating a multi-sided digital image according to the embodiments of the present invention. At 505, a user, via a mobile smart device, submits two images by supplying both images or by selecting one image from a list of images provided by the operator and selecting a user's image. Alternatively, the user may select an image and a video. In one embodiment, a video is limited in duration (e.g., 7 seconds). In this embodiment, the video plays and a frame of the video acts as an image. At 510, a user submits an audio track by accepting a default track provided by the operator or a user may create an audio track. At 515, the two-sided digital image is generated with one image/video depicted on each side. An animation application, tool and/or framework perform a rotation animation using the images. The accompanying audio track is submitted asynchronously to an audio playback application or tool which marries the rotation animation and audio track. At 520, the user may share the two-sided digital image and audio track via social media, text or email, the images and audio track are submitted to an A/V application, tool and/or framework to render them into a movie file. If a video is part of the two-sided digital image, the video is played first followed by the two-sided digital image and audio track.

While the sponsor may transmit the sponsor image to the user upon detection, in another embodiment, the sponsor requests a digital personal photo image from the user upon detection of the user's mobile smart device in its retail location and creates an animated or video-based multi-sided digital image which the sponsor transmits to the user's computer device. In this embodiment, the sponsor (via the App 115) creates the animated or video-based multi-sided digital image for the user. In another embodiment, with permission from the user, the sponsor may disseminate the multi-sided digital images the sponsor creates using the digital personal photo provided.

In another embodiment, the user may share the multi-sided digital image automatically with social media websites such as Facebook®, Twitter®, etc., by responding to a share request transmitted to the user's mobile device or computer device.

Although the invention has been described in detail with reference to several embodiments, additional variations and modifications exist within the scope and spirit of the invention as described and defined in the following claims.

I claim:

1. A system comprising:
    at least one processor configured to run an image forming application, said processor in communication with one or more computer devices, each of said one or more computer devices including a display, user interface, and memory in communication with said at least one processor; and
    wherein said processor running said image forming application is configured to: (i) receive a user-selected digital sponsor image selected from one or more digital sponsor images and a user's digital personal photo stored in memory associated with said computer device, said digital sponsor images transmitted by third-party sponsors to said user for selection therefrom responsive to said user being detected within a pre-established location, said digital sponsor images related to a live promotional event of said third-party sponsor occurring at said pre-established location; (ii) generate an animated or video-based multi-sided digital image with at least one side depicting said user-selected digital sponsor image and at least another side depicting said digital personal photo, said animated or video-based multi-sided digital image configured to rotate and/or flip on a display of said one or more computer devices to show said digital sponsor image and said digital personal photo; and (iii) transmit said animated or video-based multi-sided digital image to a user's computer device;

wherein the system is configured to, in response to receiving a detected location of the user's computer device, send a notice to the user's computer device, said notice seeking feedback regarding:

(i) whether or not said user's computer device stores an application for generating said animated or video-based multi-sided digital image; and (ii) whether or not the user desires to download an application on said user's computer device for generating said animated or video-based multisided digital image.

2. The system of claim 1 wherein said processor running said image forming application is further configured to incorporate an audio track and/or voice tag with said animated or video-based multi-sided digital image.

3. The system of claim 1 wherein said processor running said image forming application is further configured to incorporate a geo-tag with said animated or video-based multi-sided digital image.

4. The system of claim 1 wherein said processor running said image forming application is further configured to incorporate a coupon with said animated or video-based multi-sided digital image.

5. The system of claim 1 wherein said image forming application is configured to: (i) generate individual animation frames; (ii) combine them into a video or animation sequence; and (iii) employ zooms and fades giving the impression of a three-dimensional physical object.

6. A method comprising:
utilizing a processor running an image forming application for:
(i) transmitting to a user one or more digital sponsor images of a third-party sponsor responsive to said user being detected in a pre-established location;
(ii) receiving a digital sponsor image selected by said user from said one or more digital sponsor images transmitted to said user, said digital sponsor images related to a specific live promotional event of said third-party sponsor occurring at said pre-established location;
(iii) receiving a digital personal photo from said user, said digital personal photo stored in memory associated with a user's computer device;
(iv) generating an animated or video-based multi-sided digital image with at least one side depicting said selected digital sponsor image and at least another side depicting said digital personal photo, said animated or video-based multi-sided digital image configured to rotate and/or flip on a display to show said digital sponsor image and said digital personal photo; and
(v) transmitting said animated or video-based multi-sided digital image to a user's computer device;

wherein in response to receiving a detected location of the user's computer device, a notice is sent to the user's computer device, said notice seeking feedback regarding:
(i) whether or not said user's computer device stores an application for generating said animated or video-based multi-sided digital image; and (ii) whether or not the user desires to download an application on said user's computer device for generating said animated or video-based multisided digital image.

7. The method of claim 6 further comprising generating an animated or video-based multi-sided digital image incorporating an audio track and/or voice tag.

8. The method of claim 6 further comprising generating an animated or video-based multi-sided digital image incorporating a geo-tag with said animated or video-based multi-sided digital image.

9. The method of claim 6 further comprising generating an animated or video-based multi-sided digital image incorporating a coupon with said animated or video-based multi-sided digital image.

10. The method of claim 6 further comprising creating said animated or video-based multi-sided digital image by (i) generating individual animation frames; (ii) combining them into a video or animation sequence; and (iii) employing zooms and fades giving the impression of a three-dimensional physical object.

11. A system comprising:
a server configured to manage user accounts, login information and/or sponsorship information, including promotional images and/or audio tracks; and
an application configured to run on a user's computer device, said application configured to:
(i) receive sponsor and/or promotional images from a library of digital sponsor and/or promotional images on said server, said digital sponsor and/or promotional images provided by third-party sponsors, said digital sponsor and/or promotional images related to a live promotional event of said third-party sponsor occurring at a pre-established location; (ii) notify said user of access to said library of digital sponsor and/or promotional images responsive to said user being detected at said pre-established location (iii) accept requests from a user to select sponsor and/or promotional images from said library of digital sponsor images on said server; (iv) receive newly taken digital personal photo for upload, said digital personal photo stored in memory associated with said user's computer device and (v) create a multi-sided digital image having at least one side in the form of said user-selected digital personal photo and at least a second side in the form of sponsor and/or promotional image, said multi-sided digital image created such that said multi-sided digital image may be flipped and/or rotated from side to side to display at least said digital personal photo and said sponsor and/or promotional image as desired by a viewer thereof;
wherein the system is configured to, in response to receiving a detected location of the user's computer device, send a notice to the user's computer device, said notice seeking feedback regarding:
(i) whether or not said user's computer device stores an application for generating said animated or video-based multi-sided digital image; and (ii) whether or not the user desires to download an application on said user's computer device for generating said animated or video-based multisided digital image.

12. The system of claim 11 wherein said application is configured to: (i) generate individual animation frames; (ii) combine them into a video or animation sequence; and (iii) employ zooms and fades giving the impression of a three-dimensional physical object.

13. A system comprising:
at least one processor configured to run an image forming application, said processor in communication with one or more computer devices, each of said one or more computer devices including a display, user interface, and memory in communication with said at least one processor; and
wherein said processor running said image forming application is configured to: (i) based on a detected location of a user's mobile device, receive a digital sponsor image provided by a third-party sponsor and a digital personal photo provided by a user, said digital sponsor image related to a live promotional event of said third-party sponsor occurring at said detected location, said digital sponsor image selected by a user from one or more sponsor images transmitted to said user based on a detected location of a user's mobile device and said digital personal photo stored in memory associated with said computer device; (ii) generate an animated or video-based multi-sided digital image with at least one side depicting said digital sponsor image provided by said third-party sponsor and at least another side depicting said digital personal photo provided by said user, said animated or video-based multi-sided digital image configured to rotate and/or flip on a display of said one or more computer devices to show said digital sponsor image provided by said third-party sponsor and said digital personal photo provided by said user; and (iii) transmit said animated or video-based multi-sided digital image to a user's computer device;
wherein the system is configured to, in response to receiving a detected location of the user's computer device, send a notice to the user's computer device, said notice seeking feedback regarding:
(i) whether or not said user's computer device stores an application for generating said animated or video-based multi-sided digital image; and (ii) whether or not the user desires to download an application on said user's computer device for generating said animated or video-based multisided digital image.

14. The system of claim 13 wherein said application is configured to: (i) generate individual animation frames; (ii) combine them into a video or animation sequence; and (iii) employ zooms and fades giving the impression of a three-dimensional physical object.

* * * * *

UNITED STATES PATENT AND TRADEMARK OFFICE
CERTIFICATE OF CORRECTION

| | | |
|---|---|---|
| PATENT NO. | : 10,311,620 B1 | Page 1 of 1 |
| APPLICATION NO. | : 15/068978 | |
| DATED | : June 4, 2019 | |
| INVENTOR(S) | : Mike Schmitt | |

It is certified that error appears in the above-identified patent and that said Letters Patent is hereby corrected as shown below:

On the Title Page

Item (12) should read Schmitt et al.

Item (72) Rodney Van Johnson Encino, CA is added as a named inventor.

Signed and Sealed this
Third Day of October, 2023

*Katherine Kelly Vidal*

Katherine Kelly Vidal
*Director of the United States Patent and Trademark Office*